(12) United States Patent
Guthrie et al.

(10) Patent No.: US 8,935,513 B2
(45) Date of Patent: Jan. 13, 2015

(54) PROCESSOR PERFORMANCE IMPROVEMENT FOR INSTRUCTION SEQUENCES THAT INCLUDE BARRIER INSTRUCTIONS

(75) Inventors: Guy L Guthrie, Austin, TX (US); William J Starke, Round Rock, TX (US); Derek E Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 520 days.

(21) Appl. No.: 13/369,029

(22) Filed: Feb. 8, 2012

(65) Prior Publication Data

US 2013/0205120 A1 Aug. 8, 2013

(51) Int. Cl.
*G06F 9/52* (2006.01)

(52) U.S. Cl.
CPC .................................. *G06F 9/52* (2013.01)
USPC .......................................................... 712/216

(58) Field of Classification Search
CPC combination set(s) only.
See application file for complete search history.

(56) References Cited

U.S. PATENT DOCUMENTS

| | | | | |
|---|---|---|---|---|
| 5,615,350 | A * | 3/1997 | Hesson et al. | 712/218 |
| 5,881,264 | A * | 3/1999 | Kurosawa | 712/217 |
| 6,029,204 | A * | 2/2000 | Arimilli et al. | 709/248 |
| 6,065,086 | A | 5/2000 | Arimilli et al. | |
| 6,088,771 | A * | 7/2000 | Steely | 711/154 |
| 6,175,930 | B1 | 1/2001 | Arimilli et al. | |
| 6,286,095 | B1 * | 9/2001 | Morris et al. | 712/216 |
| 6,460,124 | B1 * | 10/2002 | Kagi et al. | 711/163 |
| 6,466,988 | B1 * | 10/2002 | Sukegawa et al. | 709/248 |
| 6,484,230 | B1 * | 11/2002 | Konigsburg et al. | 711/100 |
| 6,606,702 | B1 | 8/2003 | Guthrie et al. | |
| 6,609,192 | B1 | 8/2003 | Guthrie et al. | |
| 6,625,660 | B1 * | 9/2003 | Guthrie et al. | 709/248 |
| 6,625,720 | B1 * | 9/2003 | Ansari | 712/4 |
| 6,691,220 | B1 | 2/2004 | Guthrie et al. | |

(Continued)

FOREIGN PATENT DOCUMENTS

| | | |
|---|---|---|
| CN | 1952900 A | 4/2007 |
| CN | 101025695 A | 8/2007 |

OTHER PUBLICATIONS

ISA/CN The State Intellectual Property Office, the P.R. China; Int'l application PCT/IB2013/050538; International Search Report and Written Opinion dated Jun. 27, 2013 (8 pg).

*Primary Examiner* — Eric Coleman
(74) *Attorney, Agent, or Firm* — Yudell Isidore PLLC; Steven L Bennett

(57) ABSTRACT

A technique for processing an instruction sequence that includes a barrier instruction, a load instruction preceding the barrier instruction, and a subsequent memory access instruction following the barrier instruction includes determining that the load instruction is resolved based upon receipt of an earliest of a good combined response for a read operation corresponding to the load instruction and data for the load instruction. The technique also includes if execution of the subsequent memory access instruction is not initiated prior to completion of the barrier instruction, initiating in response to determining the barrier instruction completed, execution of the subsequent memory access instruction. The technique further includes if execution of the subsequent memory access instruction is initiated prior to completion of the barrier instruction, discontinuing in response to determining the barrier instruction completed, tracking of the subsequent memory access instruction with respect to invalidation.

13 Claims, 9 Drawing Sheets

(56) References Cited

U.S. PATENT DOCUMENTS

| | | |
|---|---|---|
| 6,725,340 B1 * | 4/2004 | Guthrie et al. ............... 711/141 |
| 6,728,873 B1 | 4/2004 | Guthrie et al. |
| 6,748,518 B1 | 6/2004 | Guthrie et al. |
| 6,963,967 B1 | 11/2005 | Guthrie et al. |
| 7,680,989 B2 * | 3/2010 | Moir et al. ............... 711/152 |
| 2005/0273583 A1 | 12/2005 | Caprioli et al. |
| 2009/0198963 A1 * | 8/2009 | Arimilli et al. ............... 712/205 |

* cited by examiner

PROCESSOR PERFORMANCE IMPROVEMENT FOR INSTRUCTION SEQUENCES THAT INCLUDE BARRIER INSTRUCTIONS

BACKGROUND

1. Field

This disclosure relates generally to processor performance improvement and, more specifically, to processor performance improvement for instruction sequences that include barrier instructions.

2. Related Art

A conventional symmetric multiprocessor (SMP) computer system, such as a server computer system, includes multiple processing units all coupled to a system interconnect, which typically comprises one or more address, data, and control buses. Coupled to the system interconnect is a system memory, which represents the lowest level of volatile memory in the multiprocessor computer system and which generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

Various processor designs have been proposed and/or implemented that have been intended to improve data processing system performance. For example, in processor designs that implement weak memory models, instructions may be re-ordered for execution as long as the operations are not restricted from being executed out-of-order. One technique for restricting execution of certain instructions has employed barrier (or synchronization) instructions to prevent execution of subsequent load or store instructions (i.e., load or store instructions following a barrier instruction) until a prior load or store instruction or instructions (i.e., a load or store instructions before the barrier instruction) is resolved.

With reference to FIG. 8, four different cases are possible with respect to employing a barrier instruction (SYNC) to enforce ordering between store (ST) and load (LD) instructions. In a first store-to-store case, a store instruction to address 'A' (ST A) before a barrier instruction (SYNC) is followed by a store instruction to address 'B' (ST B) after the barrier instruction (SYNC). In a second store-to-load case, a store instruction to address 'A' (ST A) before a barrier instruction (SYNC) is followed by a load instruction to address 'B' (LD B) after the barrier instruction (SYNC). In a third load-to-load case, a load instruction to address 'A' (LD A) before a barrier instruction (SYNC) is followed by a load instruction to address 'B' (LD B) after the barrier instruction (SYNC). In a fourth load-to-store case, a load instruction to address 'A' (LD A) before a barrier instruction (SYNC) is followed by a store instruction to address 'B' (ST B) after the barrier instruction (SYNC).

In the first case, the barrier instruction (SYNC) has maintained order between the store instructions (ST A and ST B) as the instruction sequence has flowed through a processor pipeline. In the second case, execution of the load instruction (LD B) following the barrier instruction (SYNC) has been delayed until the store instruction (ST A) before the barrier instruction (SYNC) was complete (or the load instruction (LD B) following the barrier instruction (SYNC) has been issued early and tracked for invalidation until an acknowledgement (ACK) for the barrier instruction (SYNC) has been received, from a memory subsystem, at a processor core). In the third case, the load instruction (LD B) following the barrier instruction (SYNC) has waited until data for the load instruction (LD A) before the barrier instruction (SYNC) has been received (or the load instruction (LD B) following the barrier instruction (SYNC) has been launched early and tracked for invalidation until the data for the load instruction (LD A) before the barrier instruction (SYNC) has been received at the processor core). In the fourth case, execution of the store instruction (ST B) following the barrier instruction (SYNC) has been delayed until data for the load instruction (LD A) before the barrier instruction (SYNC) has been received at the processor core.

In conventional implementations, a load instruction prior to a barrier instruction has been resolved when data (for the load instruction) has been returned to the processor core. In contrast, in conventional implementations, a store instruction prior to a barrier instruction has been resolved when an acknowledgment (ACK) is received (for a subsequent barrier instruction) at the processor core from a memory subsystem (e.g., an L2 cache). With reference to cases 10 of FIG. 8, conventional implementations have either speculatively executed and tracked load instructions that follow a barrier instruction for invalidation (with invalidated load instructions being re-executed) or (in the event that tracking logic is not available) delayed execution of load instructions following the barrier instruction until the instructions (ST A or LD A) before the barrier instruction have been resolved, as noted above. With reference to cases 12 of FIG. 8, conventional implementations have delayed execution of instructions (LD B or ST B) that follow a barrier instruction until data for the load instruction (LD A) is received by the processor core.

SUMMARY

According to one aspect of the present disclosure, a technique for processing an instruction sequence that includes a barrier instruction, a load instruction preceding the barrier instruction, and a subsequent memory access instruction following the barrier instruction includes determining, by a processor core, that the load instruction is resolved based upon receipt by the processor core of an earliest of a good combined response for a read operation corresponding to the load instruction and data for the load instruction. The technique also includes if execution of the subsequent memory access instruction is not initiated prior to completion of the barrier instruction, initiating by the processor core, in response to determining the barrier instruction completed, execution of the subsequent memory access instruction. The technique further includes if execution of the subsequent memory access instruction is initiated prior to completion of the barrier instruction, discontinuing by the processor core, in response to determining the barrier instruction completed, tracking of the subsequent memory access instruction with respect to invalidation.

BRIEF DESCRIPTION OF THE DRAWINGS

The present invention is illustrated by way of example and is not intended to be limited by the accompanying figures, in which like references indicate similar elements. Elements in the figures are illustrated for simplicity and clarity and have not necessarily been drawn to scale.

DETAILED DESCRIPTION

Figure 1:
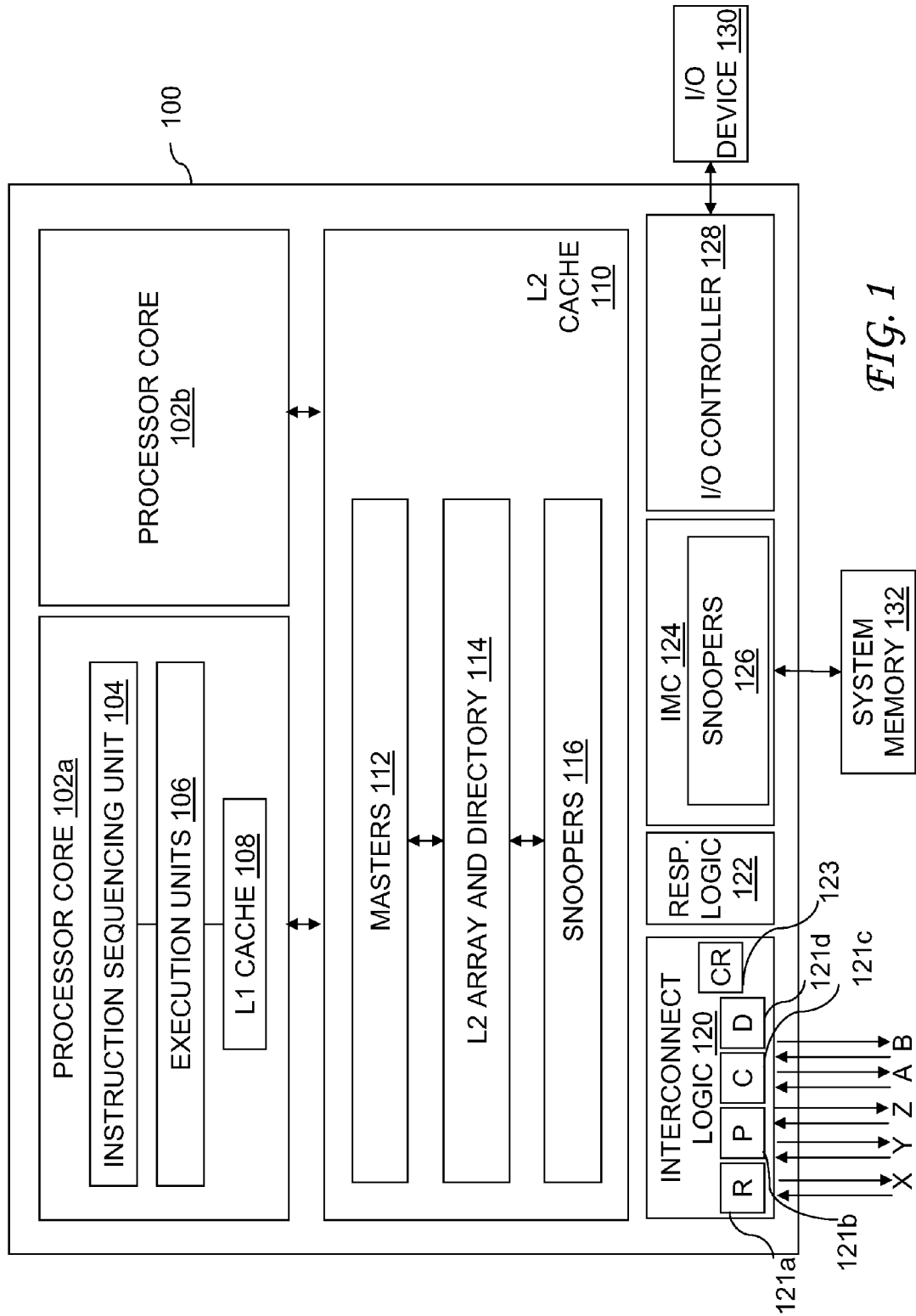
FIG. 1 is a diagram of a relevant portion of a processing unit configured according to aspects of the present disclosure.

As will be appreciated by one of ordinary skill in the art, aspects of the present invention may be embodied as a system, method or computer program product. Accordingly, aspects of the present invention may take the form of a hardware embodiment or an embodiment combining software (including firmware, resident software, micro-code, etc.) and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of the computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, or device.

Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Data processing systems exploiting weak memory models allow for a great deal of reordering of operations and allow for storage modifying operations to affect different processors in a non-atomic fashion (i.e., store operations may take effect at various processors of a multiprocessor data processing system at different points in time). In data processing systems that employ weak memory models, it is desirable to enforce ordering and atomicity for certain memory access operations across all processors of a multiprocessor data processing system. A typical approach for enforcing such operation ordering utilizes barrier (synchronization or fence) instructions in an instruction sequence. Barrier instructions force load and store instructions on different sides of a barrier instruction to be performed in order across the system and may restore the atomicity of store instructions under certain circumstances. The performance of barrier instructions is a critical aspect of weak memory model machines. As such, it is desirable for barrier instructions to execute as efficiently as possible. To achieve operation ordering and restoration of atomicity, a barrier instruction waits for certain events to occur to indicate a load or store instruction preceding the barrier instruction has progressed sufficiently far in a data processing system (i.e., has been resolved) before allowing the barrier instruction to complete and then allowing memory access operations after the barrier instruction to proceed.

According to various embodiments of the present disclosure, the particular micro-architectural events on which barrier instructions wait are enhanced to allow instruction sequences with barrier instructions to be processed more efficiently. Conventional implementations have waited for data to be returned to a processor core in order to indicate that a load instruction associated with the data has been resolved. In many cases, waiting for data of a load instruction to be returned to a processor core prior to releasing a barrier enforces a delay that is longer than is necessary and, as such, slows down processor execution of an instruction sequence that includes the load instruction. In current coherence protocol implementations, a coherence protocol may return a combined response (Cresp) indication that a value for a load instruction has been bound or determined before actual data for the load instruction is returned to a processor core. According to the present disclosure, a load instruction preceding a barrier instruction is deemed to be resolved upon the earliest occurrence of a good Cresp for the load instruction or data "home" (i.e., data returned to the requesting processor core) for the load instruction, thereby allowing the barrier implemented by the barrier instruction to be released and execution of memory access instructions following the barrier instruction to proceed. In many cases, Cresp for the load instruction is received by the processor core prior to the load data, meaning that processing of the instruction sequence is accelerated as compared to prior implementations requiring data home to resolve a load instruction that precedes a barrier instruction.

As previously mentioned, a barrier instruction may be utilized to enforce ordering in four cases: load-to-load, load-to-store, store-to-load, and store-to-store. According to the present disclosure, the performance of instruction sequences with barrier instructions that order load instructions preceding a barrier instruction are addressed. It should be appreciated that the store-to-store ordering case has no data being returned in response to a store operation prior to a barrier instruction and, as such, is not addressed by the present disclosure. Similarly, the store-to-load ordering case is not affected because load instructions that occur after a barrier instruction are generally already speculatively launched before the barrier instruction is complete and restarted if circumstances require that the load instruction should not have been executed earlier.

According to the present disclosure, load-to-load ordering is achieved by allowing load instructions preceding and following the barrier instruction to execute in any order. However, load instructions after the barrier instruction are tracked (until the barrier instruction completes) for any invalidations that indicate a location referenced by a load instruction after the barrier instruction has changed its value. Currently, the barrier instruction can complete (and therefore tracking of younger load instructions following the barrier instruction can cease) when older load instructions before the barrier instruction have received their data and a SYNC ACK has been received from the storage subsystem (indicating the store instructions prior to the barrier instruction have been performed with respect to all processors). Likewise, in current implementations, store instructions that occur after a barrier instruction are delayed until the barrier instruction completes. Because these younger store instructions change system state, the younger store instructions, unlike the younger load instructions, cannot be started until the barrier instruction completes.

According to the present disclosure, instead of waiting for data home on prior load instructions, a processor core considers an older load instruction resolved when either a good Cresp occurs (a good Cresp indicates that the value to be returned for the older load instruction has been bound to the older load instruction) or when data returns. When a read-claim (RC) machine receives a good Cresp for a read operation, the RC machine sends an indication (e.g., on a reload bus) to the processor core to indicate a good Cresp has occurred for the given load instruction. The processor core then utilizes the Cresp, in addition to the existing mechanism for monitoring for return of requested data, to release dependence of the barrier instruction on the load instruction. In certain cases, the Cresp for a load instruction can occur several hundred processor cycles before data for the load instruction is returned. When Cresp is returned before data, processor performance is improved by releasing the barrier instruction dependence (for that load instruction) at the point the Cresp is received.

According to various embodiments of the present disclosure, the fact that at the point of a Cresp a load instruction is resolved with respect to all processors in a data processing system (since the value the load instruction returns is bound when Cresp is returned) is utilized to accelerate processing of an instruction sequence. For example, when a Cresp for a load instruction is received by a processor core before data for the load instruction is received by the processor core, instructions following the load instruction that are after a barrier instruction may begin execution before the data for the load instruction arrives at the processor core.

With reference now to the figures and, in particular, with reference to FIG. 1, there is illustrated a high level block diagram of an exemplary embodiment of a processing unit 100 in accordance with the present disclosure. In the depicted embodiment, processing unit 100 is a single integrated circuit including two processor cores 102a, 102b for independently processing instructions and data. Each processor core 102 includes an instruction sequencing unit (ISU) 104 for fetching and ordering instructions for execution and one or more execution units 106 for executing instructions. The instructions executed by execution units 106 may include, for example, fixed and floating point arithmetic instructions, logical instructions, and instructions that request read and write access to a memory block. For example, execution units 106 may include one or more floating-point units (FPUs), one or more load-store units (LSUs), and one or more integer units (IUs).

The operation of each processor core 102a, 102b is supported by a multi-level volatile memory hierarchy having at its lowest level one or more shared system memories 132 (only one of which is shown in FIG. 1) and, at its upper levels, one or more levels of cache memory. As depicted, processing unit 100 includes an integrated memory controller (IMC) 124 that controls read and write access to a system memory 132 in response to requests received from processor cores 102a, 102b and operations snooped on an interconnect fabric (described below) by snoopers 126.

In the illustrative embodiment, the cache memory hierarchy of processing unit 100 includes a store-through level one (L1) cache 108 within each processor core 102a, 102b and a level two (L2) cache 110 shared by all processor cores 102a, 102*b* of the processing unit 100. L2 cache 110 includes an L2 array and directory 114, masters 112 and snoopers 116 and may be configured in multiple slices. Masters 112 initiate transactions on the interconnect fabric and access L2 array and directory 114 in response to memory access (and other) requests received from the associated processor cores 102*a*, 102*b*. Snoopers 116 detect operations on the interconnect fabric, provide appropriate responses, and perform any accesses to L2 array and directory 114 required by the operations. Although the illustrated cache hierarchy includes only two levels of cache, those skilled in the art will appreciate that alternative embodiments may include additional levels (level three (L3), level four (L4), etc.) of on-chip or off-chip in-line or look-aside cache, which may be fully inclusive, partially inclusive, or non-inclusive of the contents the upper levels of cache.

As further shown in FIG. 1, processing unit 100 includes integrated interconnect logic 120 by which processing unit 100 may be coupled to the interconnect fabric as part of a larger data processing system. In the depicted embodiment, interconnect logic 120 supports an arbitrary number t1 of "first tier" interconnect links, which in this case include in-bound and out-bound 'X', 'Y' and 'Z' links. Interconnect logic 120 further supports an arbitrary number t2 of second tier links, designated in FIG. 1 as in-bound and out-bound 'A' and 'B' links. With these first and second tier links, each processing unit 100 may be coupled for bi-directional communication to up to t1/2+t2/2 (in this case, five) other processing units 100. Interconnect logic 120 includes request logic (labeled 'R') 121*a*, partial response logic (labeled 'P') 121*b*, combined response logic (labeled 'C') 121*c* and data logic (labeled 'D') 121*d* for processing and forwarding information during different phases of operations. In addition, interconnect logic 120 includes a configuration register (labeled 'CR') 123 including a plurality of mode bits utilized to configure processing unit 100. These mode bits preferably include: (1) a first set of one or more mode bits that selects a desired link information allocation for the first and second tier links; (2) a second set of mode bits that specify which of the first and second tier links of the processing unit 100 are connected to other processing units 100; and (3) a third set of mode bits that determines a programmable duration of a protection window extension.

Each processing unit 100 further includes an instance of response logic 122, which implements a portion of a distributed coherency signaling mechanism that maintains cache coherency between the cache hierarchy of processing unit 100 and those of other processing units 100. Finally, each processing unit 100 includes an integrated I/O (input/output) controller 128 supporting the attachment of one or more I/O devices, such as I/O device 130. I/O controller 128 may issue operations and receive data on the 'X', 'Y', 'Z', 'A', and 'B' links in response to requests by I/O device 130.

Figure 2:
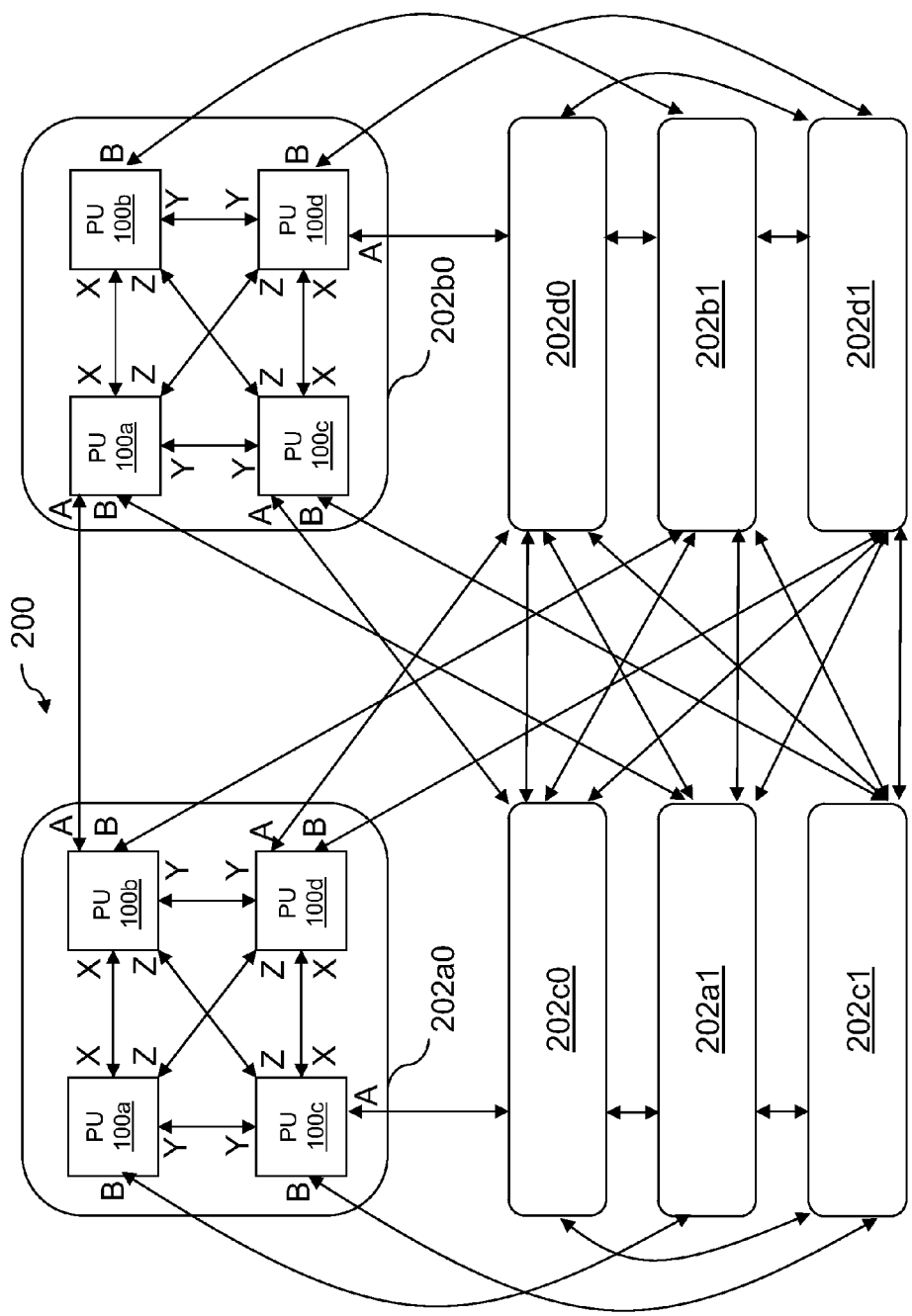
FIG. 2 is a diagram of a relevant portion of an exemplary data processing system configured according to aspects of the present disclosure.

Referring now to FIG. 2, there is depicted a block diagram of an exemplary embodiment of a data processing system 200 formed of multiple processing units 100 in accordance with the present invention. As shown, data processing system 200 includes eight processing nodes 202*a*0-202*d*0 and 202*a*1-202*d*1, which may each be realized as a multi-chip module (MCM) comprising a package containing four processing units 100. The processing units 100 within each processing node 202 are coupled for point-to-point communication by the processing units' 'X', 'Y', and 'Z' links, as shown. Each processing unit 100 may be further coupled to processing units 100 in two different processing nodes 202 for point-to-point communication by the processing units' 'A' and 'B' links. Although illustrated in FIG. 2 with a double-headed arrow, it should be understood that each pair of 'X', 'Y', 'Z', 'A', and 'B' links are preferably (but not necessarily) implemented as two uni-directional links, rather than as a bi-directional link.

General expressions for forming the topology shown in FIG. 2 can be given as follows:

Node[I][K].chip[J].link[K] connects to Node[J][K].chip[I].link[K], for all I≠J; and Node[I][K].chip[I].link[K] connects to Node[I][not K].chip[I].link[not K]; and Node[I][K].chip[I].link[not K] connects either to:
(1) Nothing in reserved for future expansion; or
(2) Node[extra][not K].chip[I].link[K], in case in which all links are fully utilized (i.e., nine 8-way nodes forming a 72-way system); and where I and J belong to the set {a, b, c, d} and K belongs to the set {0,1}.

Of course, alternative expressions can be defined to form other functionally equivalent topologies. Moreover, it should be appreciated that the depicted topology is representative but not exhaustive of data processing system topologies embodying the present invention and that other topologies are possible. In such alternative topologies, for example, the number of first tier and second tier links coupled to each processing unit 100 can be an arbitrary number, and the number of processing nodes 202 within each tier (i.e., I) need not equal the number of processing units 100 per processing node 100 (i.e., J).

Those skilled in the art will appreciate that SMP data processing system 100 can include many additional unillustrated components, such as interconnect bridges, non-volatile storage, ports for connection to networks or attached devices, etc. Because such additional components are not necessary for an understanding of the present invention, they are not illustrated in FIG. 2 or discussed further herein.

Figure 3:
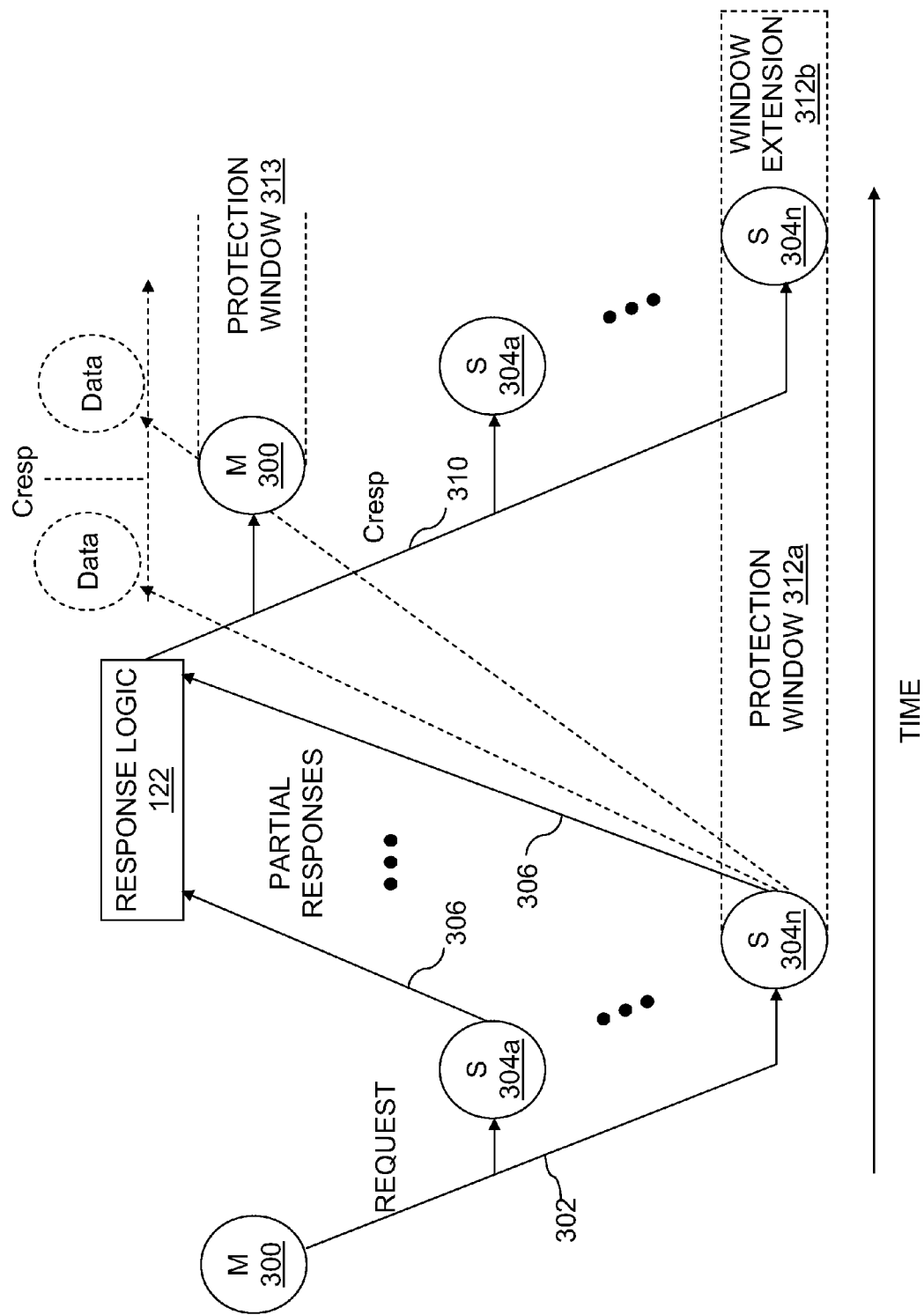
FIG. 3 is a diagram of an exemplary operation including a request phase, a partial response (Presp) phase, and a combined response (Cresp) phase implemented within the data processing system of FIG. 2.

Referring now to FIG. 3, there is depicted a time-space diagram of an exemplary operation on the interconnect fabric of data processing system 200 of FIG. 2. The operation begins when a master 300 (e.g., a master 112 of an L2 cache 110 or a master within an I/O controller 128) issues a request 302 on the interconnect fabric. Request 302 preferably includes at least a transaction type indicating a type of desired access and a resource identifier (e.g., real address) indicating a resource to be accessed by the request. Common types of requests include those set forth below in Table I.

TABLE I

| Request | Description |
| --- | --- |
| READ | Requests a copy of the image of a memory block for query purposes |
| RWITM (Read-With-Intent-To-Modify) | Requests a unique copy of the image of a memory block with the intent to update (modify) it and requires destruction of other copies, if any |
| DCLAIM (Data Claim) | Requests authority to promote an existing query-only copy of memory block to a unique copy with the intent to update (modify) it and requires destruction of other copies, if any |

TABLE I-continued

| Request | Description |
| --- | --- |
| DCBZ (Data Cache Block Zero) | Requests authority to create a new unique copy of a memory block without regard to its present state and subsequently modify its contents; requires destruction of other copies, if any |
| CASTOUT | Copies the image of a memory block from a higher level of memory to a lower level of memory in preparation for the destruction of the higher level copy |
| WRITE | Requests authority to create a new unique copy of a memory block without regard to its present state and immediately copy the image of the memory block from a higher level memory to a lower level memory in preparation for the destruction of the higher level copy |
| PARTIAL WRITE | Requests authority to create a new unique copy of a partial memory block without regard to its present state and immediately copy the image of the partial memory block from a higher level memory to a lower level memory in preparation for the destruction of the higher level copy |

Further details regarding these operations and an exemplary cache coherency protocol that facilitates efficient handling of these operations may be found in U.S. Pat. No. 7,774,555, which is incorporated herein by reference in its entirety for all purposes.

Request 302 is received by snoopers 304, for example, snoopers 116 of L2 caches 110 and snoopers 126 of IMCs 124, distributed throughout data processing system 200. In general, with some exceptions, snoopers 116 in the same L2 cache 110 as the master 112 of request 302 do not snoop request 302 (i.e., there is generally no self-snooping) because a request 302 is transmitted on the interconnect fabric only if the request 302 cannot be serviced internally by a processing unit 100. Snoopers 304 that receive and process requests 302 each provide a respective partial response 306 representing the response of at least that snooper 304 to request 302. A snooper 126 within an IMC 124 determines the partial response 306 to provide based, for example, upon whether the snooper 126 is responsible for the request address and whether it has resources available to service the request. A snooper 116 of an L2 cache 110 may determine its partial response 306 based on, for example, the availability of its L2 cache directory 114, the availability of a snoop logic instance within snooper 116 to handle the request, and the coherency state associated with the request address in L2 cache directory 114.

The partial responses 306 of snoopers 304 are logically combined either in stages or all at once by one or more instances of response logic 122 to determine a system-wide combined response (Cresp) 310 to request 302. In one embodiment, which is assumed hereinafter, the instance of response logic 122 responsible for generating Cresp 310 is located in the processing unit 100 containing the master 300 that issued request 302. Response logic 122 provides Cresp 310 to master 300 and snoopers 304 via the interconnect fabric to indicate the system-wide response (e.g., success, failure, retry, etc.) to request 302. If Cresp 310 indicates success of request 302, Cresp 310 may indicate, for example, a data source for a requested memory block, a cache state in which the requested memory block is to be cached by master 300, and whether "cleanup" operations invalidating the requested memory block in one or more L2 caches 110 are required.

In response to receipt of Cresp 310, one or more of master 300 and snoopers 304 typically perform one or more operations in order to service request 302. These operations may include supplying data to master 300, invalidating or otherwise updating the coherency state of data cached in one or more L2 caches 110, performing castout operations, writing back data to a system memory 132, etc. If required by request 302, a requested or target memory block may be transmitted to or from master 300 before or after the generation of Cresp 310 by response logic 122.

In the following description, the partial response 306 of a snooper 304 to a request 302 and the operations performed by the snooper 304 in response to the request 302 and/or its combined response 310 will be described with reference to whether that snooper is a Highest Point of Coherency (HPC), a Lowest Point of Coherency (LPC), or neither with respect to the request address specified by the request. An LPC is defined herein as a memory device or I/O device that serves as the repository for a memory block. In the absence of a HPC for the memory block, the LPC holds the true image of the memory block and has authority to grant or deny requests to generate an additional cached copy of the memory block. For a typical request in the data processing system embodiment of FIGS. 1 and 2, the LPC will be the memory controller 124 for the system memory 132 holding the referenced memory block. An HPC is defined herein as a uniquely identified device that caches a true image of the memory block (which may or may not be consistent with the corresponding memory block at the LPC) and has the authority to grant or deny a request to modify the memory block. Descriptively, the HPC may also provide a copy of the memory block to a requestor in response to an operation that does not modify the memory block. Thus, for a typical request in the data processing system embodiment of FIGS. 1 and 2, the HPC, if any, will be an L2 cache 110. Although other indicators may be utilized to designate an HPC for a memory block, a preferred embodiment of the present invention designates the HPC, if any, for a memory block utilizing selected cache coherency state(s) within the L2 cache directory 114 of an L2 cache 110.

Still referring to FIG. 3, the HPC, if any, for a memory block referenced in a request 302, or in the absence of an HPC, the LPC of the memory block, preferably has the responsibility of protecting the transfer of ownership of a memory block, if necessary, in response to a request 302. In the exemplary scenario shown in FIG. 3, a snooper 304n at the HPC (or in the absence of an HPC, the LPC) for the memory block specified by the request address of request 302 protects the transfer of ownership of the requested memory block to master 300 during a protection window 312a that extends from the time that snooper 304n determines its partial response 306 until snooper 304n receives Cresp 310 and during a subsequent window extension 312b extending a programmable time beyond receipt by snooper 304n of Cresp 310. During protection window 312a and window extension 312b, snooper 304n protects the transfer of ownership by providing partial responses 306 to other requests specifying the same request address that prevent other masters from obtaining ownership (e.g., a retry partial response) until ownership has been successfully transferred to master 300. Master 300 likewise initiates a protection window 313 to protect its ownership of the memory block requested in request 302 following receipt of combined response 310.

Because snoopers 304 all have limited resources for handling the CPU and I/O requests described above, several different levels of partial responses and corresponding Cresps are possible. For example, if a snooper 126 within a memory controller 124 that is responsible for a requested memory block has a queue available to handle a request, the snooper 126 may respond with a partial response indicating that it is able to serve as the LPC for the request. If, on the other hand, the snooper 126 has no queue available to handle the request, the snooper 126 may respond with a partial response indicating that it is the LPC for the memory block, but is unable to currently service the request. Similarly, a snooper 116 in an L2 cache 110 may require an available instance of snoop logic and access to L2 cache directory 114 in order to handle a request. Absence of access to either (or both) of these resources results in a partial response (and corresponding Cresp) signaling an inability to service the request due to absence of a required resource.

As is further illustrated in FIG. 3, snooper 304n may return data (for a load instruction preceding a barrier instruction in an instruction sequence) to master 300 (i.e., master 112 of L2 cache 110) before or after master 300 receives a Cresp (for the load instruction) from response logic 122. According to the present disclosure, in the event that master 300 receives a Cresp from response logic 122 prior to snooper 304n returning data, master 300 returns the Cresp to processor core 102, which, in turn, resolves the load instruction and can allow the barrier instruction to resolve and load and store instructions subsequent to the barrier instruction to begin execution when execution of the instructions subsequent to the barrier instruction have not already been initiated. In the event that execution of load instructions subsequent to the barrier instruction have already been initiated by processor 102 prior to receipt of the Cresp or data, processor core 102 discontinues the utilization of invalidation tracking logic for the executing load instructions that are subsequent to the barrier instruction in the instruction sequence.

Figure 4:
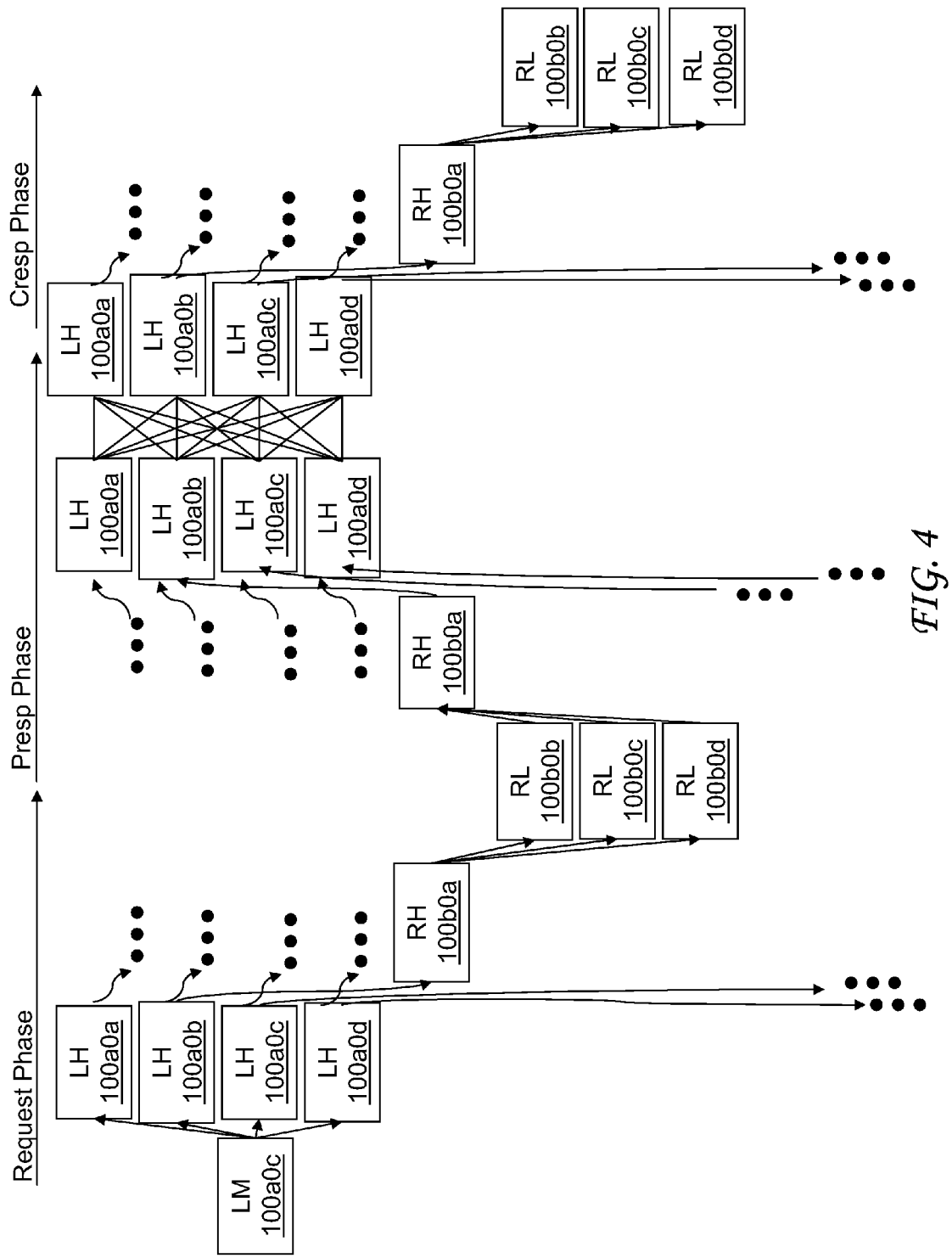
FIG. 4 is a diagram of an exemplary operation within the data processing system of FIG. 2.

Referring now to FIG. 4, there is illustrated a time-space diagram of an exemplary operation flow in data processing system 200 of FIG. 2. In these figures, the various processing units 100 within data processing system 200 are tagged with two locational identifiers—a first identifying the processing node 202 to which the processing unit 100 belongs and a second identifying the particular processing unit 100 within the processing node 202. Thus, for example, processing unit 100a0c refers to processing unit 100c of processing node 202a0. In addition, each processing unit 100 is tagged with a functional identifier indicating its function relative to the other processing units 100 participating in the operation. These functional identifiers include: (1) local master (LM), which designates the processing unit 100 that originates the operation, (2) local hub (LH), which designates a processing unit 100 that is in the same processing node 202 as the local master and that is responsible for transmitting the operation to another processing node 202 (a local master can also be a local hub), (3) remote hub (RH), which designates a processing unit 100 that is in a different processing node 202 than the local master and that is responsible to distribute the operation to other processing units 100 in its processing node 202, and (4) remote leaf (RL), which designates a processing unit 100 that is in a different processing node 202 from the local master and that is not a remote hub.

As shown in FIG. 4, the exemplary operation has at least three phases as described above with reference to FIG. 3, namely, a request (or address) phase, a partial response (Presp) phase, and a combined response (Cresp) phase. These three phases preferably occur in the foregoing order and do not overlap. The operation may additionally have a data phase, which may optionally overlap with any of the request, partial response and combined response phases.

Still referring to FIG. 4, the request phase begins when a local master 100a0c (i.e., processing unit 100c of processing node 202a0) performs a synchronized broadcast of a request, for example, a read request, to each of the local hubs 100a0a, 100a0b, 100a0c and 100a0d within its processing node 202a0. It should be noted that the list of local hubs includes local hub 100a0c, which is also the local master. This internal transmission may be advantageously employed to synchronize the operation of local hub 100a0c with local hubs 100a0a, 100a0b and 100a0d so that the timing constraints can be more easily satisfied.

In response to receiving the request, each local hub 100 that is coupled to a remote hub 100 by its 'A' or 'B' links transmits the operation to its remote hub(s) 100. Thus, local hub 100a0a makes no transmission of the operation on its outbound 'A' link, but transmits the operation via its outbound 'B' link to a remote hub within processing node 202a1. Local hubs 100a0b, 100a0c and 100a0d transmit the operation via their respective outbound 'A' and 'B' links to remote hubs in processing nodes 202b0 and 202b1, processing nodes 202c0 and 202c1, and processing nodes 202d0 and 202d1, respectively. Each remote hub 100 receiving the operation, in turn, transmits the operation to each remote leaf 100 in its processing node 202. Thus, for example, remote hub 100b0a transmits the operation to remote leaves 100b0b, 100b0c and 100b0d. In this manner, the operation is efficiently broadcast to all processing units 100 within data processing system 200 utilizing transmission over no more than three links.

Following the request phase, the partial response (Presp) phase occurs. In the partial response phase, each remote leaf 100 evaluates the operation and provides its partial response to the operation to its respective remote hub 100. For example, remote leaves 100b0b, 100b0c and 100b0d transmit their respective partial responses to remote hub 100b0a. Each remote hub 100 in turn transmits these partial responses, as well as its own partial response, to a respective one of local hubs 100a0a, 100a0b, 100a0c and 100a0d. Local hubs 100a0a, 100a0b, 100a0c and 100a0d then broadcast these partial responses, as well as their own partial responses, to each local hub 100 in processing node 202a0. It should be noted that the broadcast of partial responses by the local hubs 100 within processing node 202a0 includes, for timing reasons, the self-broadcast by each local hub 100 of its own partial response.

As will be appreciated, the collection of partial responses in the manner shown can be implemented in a number of different ways. For example, it is possible to communicate an individual partial response back to each local hub from each other local hub, remote hub and remote leaf. Alternatively, for greater efficiency, it may be desirable to accumulate partial responses as they are communicated back to the local hubs. In order to ensure that the effect of each partial response is accurately communicated back to local hubs 100, it is preferred that the partial responses be accumulated, if at all, in a non-destructive manner, for example, utilizing a logical OR function and an encoding in which no relevant information is lost when subjected to such a function (e.g., a "one-hot" encoding).

As further shown in FIG. 4, response logic 122 at each local hub 100 within processing node 202a0 compiles the partial responses of the other processing units 100 to obtain a combined response representing the system-wide response to the request. Local hubs 100a0a-100a0d then broadcast the combined response to all processing units 100 following the same paths of distribution as employed for the request phase. Thus, the combined response is first broadcast to remote hubs 100, which in turn transmit the combined response to each remote leaf 100 within their respective processing nodes 202. For example, local hub 100a0b transmits the combined response to remote hub 100b0a, which in turn transmits the combined response to remote leaves 100b0b, 100b0c and 100b0d.

As noted above, servicing the operation may require an additional data phase. For example, if the operation is a read-type operation, such as a read or RWITM operation, remote leaf 100b0d may source the requested memory block to local master 100a0c via the links connecting remote leaf 100b0d to remote hub 100b0a, remote hub 100b0a to local hub 100a0b, and local hub 100a0b to local master 100a0c. Conversely, if the operation is a write-type operation, for example, a cache castout operation writing a modified memory block back to the system memory 132 of remote leaf 100b0b, the memory block is transmitted via the links connecting local master 100a0c to local hub 100a0b, local hub 100a0b to remote hub 100b0a, and remote hub 100b0a to remote leaf 100b0b.

Of course, the scenario depicted in FIG. 4 is merely exemplary of the myriad of possible operations that may occur concurrently in a multiprocessor data processing system such as data processing system 200.

As described above with reference to FIG. 3, coherency is maintained during the "handoff" of coherency ownership of a memory block from a snooper 304n to a requesting master 300 in the possible presence of other masters competing for ownership of the same memory block through protection window 312a, window extension 312b, and protection window 313. For example, protection window 312a and window extension 312b must together be of sufficient duration to protect the transfer of coherency ownership of the requested memory block to winning master (WM) 300 in the presence of a competing request by a competing master (CM). To ensure that protection window 312a and window extension 312b have sufficient duration to protect the transfer of ownership of the requested memory block to winning master 300, the latency of communication between processing units 100 in accordance with FIG. 4 is preferably constrained such that the following conditions are met:

$$A\_lat(CM\_S) \leq A\_lat(CM\_WM) + C\_lat(WM\_S) + \epsilon,$$

where A_lat(CM_S) is the address latency of any competing master (CM) to the snooper (S) 304n owning coherence of the requested memory block, A_lat(CM_WM) is the address latency of any competing master (CM) to the "winning" master (WM) 300 that is awarded coherency ownership by snooper 304n, C_lat(WM_S) is the combined response latency from the time that the combined response is received by the winning master (WM) 300 to the time the combined response is received by the snooper (S) 304n owning the requested memory block, and $\epsilon$ is the duration of window extension 312b.

If the foregoing timing constraint, which is applicable to a system of arbitrary topology, is not satisfied, the request of the competing master may be received (1) by winning master 300 prior to winning master 300 assuming coherency ownership and initiating protection window 312b and (2) by snooper 304n after protection window 312a and window extension 312b end. In such cases, neither winning master 300 nor snooper 304n will provide a partial response to the competing request that prevents the competing master from assuming coherency ownership of the memory block and reading non-coherent data from memory. However, to avoid this coherency error, window extension 312b can be programmably set (e.g., by appropriate setting of configuration register (CR) 123) to an arbitrary length ($\epsilon$) to compensate for latency variations or the shortcomings of a physical implementation that may otherwise fail to satisfy the timing constraint that must be satisfied to maintain coherency. Thus, by solving the above equation for 8, the ideal length of window extension 312b for any implementation can be determined.

Several observations may be made regarding the foregoing timing constraint. First, the address latency from the competing master to the owning snooper 304a has no necessary lower bound, but must have an upper bound. The upper bound is designed for by determining the worst case latency attainable given, among other things, the maximum possible oscillator drift, the longest links coupling processing units 100, the maximum number of accumulated stalls, and guaranteed worst case throughput. In order to ensure the upper bound is observed, the interconnect fabric must ensure non-blocking behavior.

Second, the address latency from the competing master to the winning master 300 has no necessary upper bound, but must have a lower bound. The lower bound is determined by the best case latency attainable, given, among other things, the absence of stalls, the shortest possible link between processing units 100 and the slowest oscillator drift given a particular static configuration.

Although for a given operation, each of the winning master 300 and competing master has only one timing bound for its respective request, it will be appreciated that during the course of operation any processing unit 100 may be a winning master for some operations and a competing (and losing) master for other operations. Consequently, each processing unit 100 effectively has an upper bound and a lower bound for its address latency.

Third, the combined response latency from the time that the combined response is generated to the time the combined response is observed by the winning master 300 has no necessary lower bound (the combined response may arrive at the winning master 300 at an arbitrarily early time), but must have an upper bound. By contrast, the combined response latency from the time that a combined response is generated until the combined response is received by the snooper 304n has a lower bound, but no necessary upper bound (although one may be arbitrarily imposed to limit the number of operations concurrently in flight).

Fourth, there is no constraint on partial response latency. That is, because all of the terms of the timing constraint enumerated above pertain to request/address latency and combined response latency, the partial response latencies of snoopers 304 and competing master to winning master 300 have no necessary upper or lower bounds.

The first tier and second tier links connecting processing units 100 may be implemented in a variety of ways to obtain the topology depicted in FIG. 2 and to meet timing constraints. In one preferred embodiment, each inbound and outbound first tier ('X', 'Y', and 'Z') link and each inbound and outbound second tier ('A' and 'B') link is implemented as a uni-directional 8-byte bus containing a number of different virtual channels or tenures to convey address, data, control and coherency information.

Figure 5:
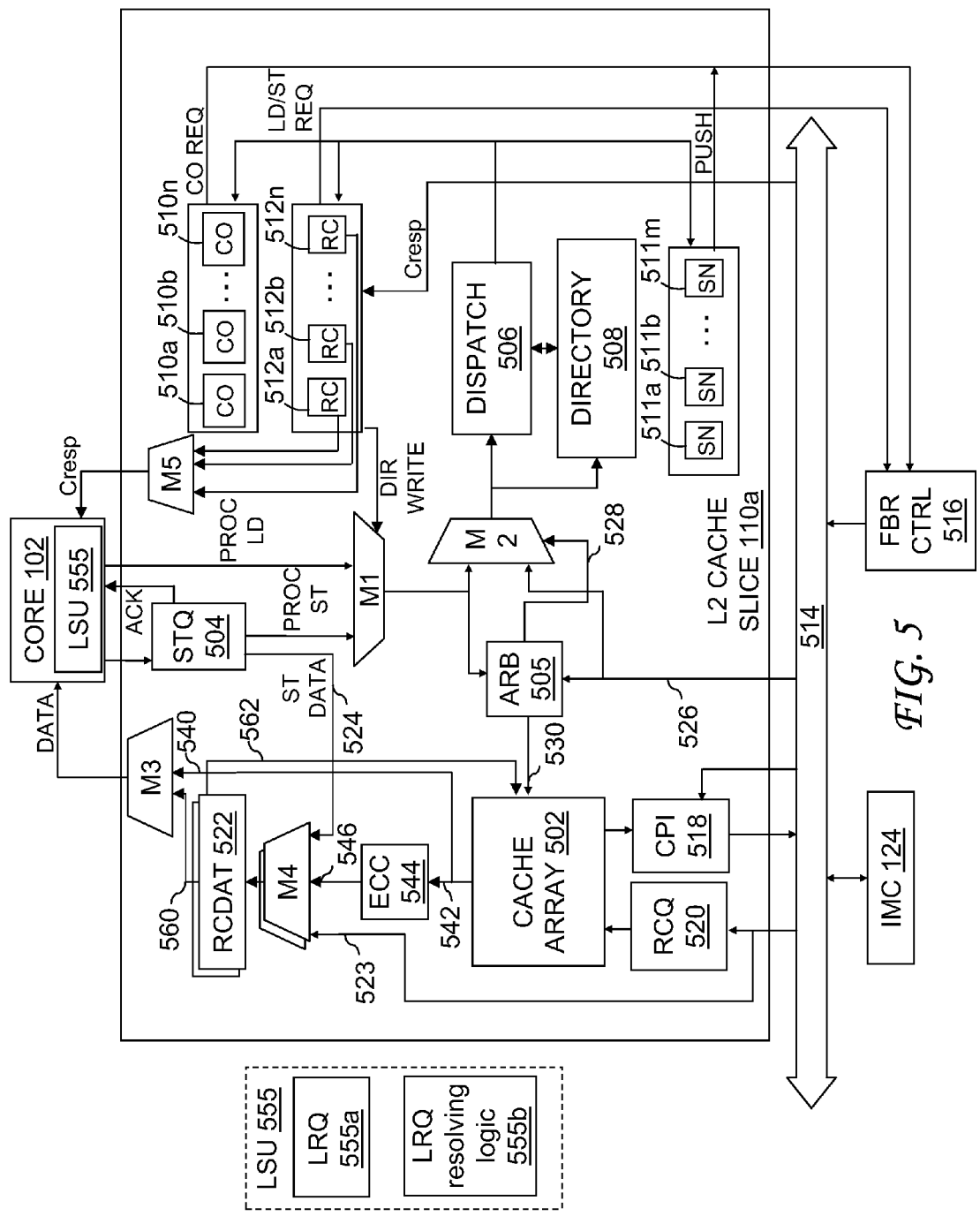
FIG. 5 is a diagram of relevant portion of a slice of an L2 cache of FIG. 1.

In order to efficiently handle multiple concurrent memory access requests to cacheable addresses, each L2 cache 110 may be implemented with multiple L2 cache slices, each of which handles memory access requests for a respective set of real memory addresses. With reference now to FIG. 5, there is illustrated a more detailed block diagram of an exemplary L2 cache slice 110a in accordance with the present disclosure. As shown in FIG. 5, L2 cache slice 110a includes a cache array 502 and a directory 508 of the contents of cache array 502. Although not explicitly illustrated, cache array 502 preferably is implemented with a single read port and single write port to reduce the die area required to implement cache array 502.

Assuming cache array 502 and directory 508 are set associative as is conventional, memory locations in system memory 132 are mapped to particular congruence classes within cache array 502 utilizing predetermined index bits within the system memory (real) addresses. The particular memory blocks stored within the cache lines of cache array 502 are recorded in cache directory 508, which contains one directory entry for each cache line. While not expressly depicted in FIG. 5, it will be understood by those skilled in the art that each directory entry in cache directory 508 includes various fields, for example, a tag field that identifies the real address of the memory block held in the corresponding cache line of cache array 502, a state field that indicate the coherency state of the cache line, and a least recently used (LRU) field indicating a replacement order for the cache line with respect to other cache lines in the same congruence class.

L2 cache slice 110a includes multiple (e.g., 16) read-claim (RC) machines 512a-512n for independently and concurrently servicing load (LD) and store (ST) requests received from the affiliated processor core 102. At least some of RC machines 512 may be implemented as smaller special-purposes RC machines that are capable of handling fewer than all possible types of memory access requests received from the affiliated processor core 102. In general, implementing special-purpose RC machines in this manner substantially reduces the die area within processing unit 100 devoted to RC machines 512.

According to one aspect of the present disclosure, RC machines 512 are also configured to return Cresps (received from local interconnect 514) for load instructions to core 102, via multiplexer M5, which may be controlled by an arbiter 505 (or other logic) via unillustrated select lines. As is illustrated in FIG. 5, core 102 also includes a load-store unit (LSU) 555 (e.g., one of execution units 106) that includes a load reorder queue (LRQ) 555a and LRQ resolving logic 555b. Resolving logic 555b of LSU 555 is configured to insert an entry for a load instruction (that is prior to a barrier instruction in an instruction sequence) into LRQ 555a and mark the entry in LRQ 555a as resolved in response to determining that the load instruction is resolved. For example, LRQ resolving logic 555b may mark an entry in LRQ 555a as resolved by asserting one or more bits of the entry. According to the present disclosure, a load instruction is resolved when processor core 102 receives a good Cresp (from L2 cache slice 110a via multiplexer M5) for the load instruction or data (from L2 cache slice 110a via multiplexer M3) for the load instruction.

In order to service remote memory access requests originating from processor cores 102 other than the affiliated processor core 102, L2 cache slice 110a includes multiple snoop machines 511a-511m. Each snoop machine 511 can independently and concurrently handle a remote memory access request "snooped" from local interconnect 514.

As will be appreciated, the servicing of memory access requests by RC machines 512 may require the replacement or invalidation of memory blocks within cache array 502. Accordingly, L2 cache slice 110a includes CO (castout) machines 510 that manage the removal and writeback of memory blocks from cache array 502.

Arbiter 505 of L2 cache slice 110a is further configured to control multiplexers M1-M2 to order the processing of local memory access requests received from affiliated processor core 102 and remote requests snooped on local interconnect 514. Memory access requests, including local load and store operations and remote read and write operations, are forwarded in accordance with the arbitration policy implemented by arbiter 505 to a dispatch pipeline 506 where each read/load and store request is processed with respect to directory 508 and cache array 502 over a given number of cycles.

L2 cache slice 110a also includes an RC queue 520 and a CPI (castout push intervention) queue 518 that respectively buffer data being inserted into and removed from the cache array 502. RC queue 520 includes a number of buffer entries that each individually correspond to a particular one of RC machines 512 such that each RC machine 512 that is dispatched retrieves data from only the designated buffer entry. Similarly, CPI queue 518 includes a number of buffer entries that each individually correspond to a particular one of the castout machines 510 and snoop machines 511, such that each CO machine 510 and each snooper 511 that is dispatched retrieves data from only the respective designated CPI buffer entry.

Each RC machine 512 also has assigned to it a respective one of multiple RC data (RCDAT) buffers 522 for buffering a memory block read from cache array 502 and/or received from local interconnect 514 via reload bus 523. The RCDAT buffer 522 assigned to each RC machine 512 is preferably constructed with connections and functionality corresponding to the memory access requests that may be serviced by the associated RC machine 512. As also discussed further below, some but not all of RCDAT buffers 522 have an associated store data multiplexer M4 that selects data bytes from among its inputs for buffering in the RCDAT buffer 522 in response unillustrated select signals generated by arbiter 505.

In operation, processor store requests comprising a transaction type (ttype), target real address, and store data are received from the affiliated processor core 102 within a store queue (STQ) 504. STQ 504 also includes barrier resolving logic (not separately illustrated) for handling barrier instructions (which are essentially special store instructions). When a barrier instruction reaches a head of STQ 504 (i.e., all store instructions prior to the barrier instruction have been pushed through STQ 504), the barrier resolving logic returns an acknowledgement (ACK) to processor core 102, which releases the barrier as is further described herein (see FIG. 9). From STQ 504, the store data are transmitted to store data multiplexer M4 via data path 524, and the store type and target address are passed to multiplexer M1. Multiplexer M1 also receives as inputs processor load requests from processor core 102 and directory write requests from RC machines 512. In response to unillustrated select signals generated by arbiter 505, multiplexer M1 selects one of its input requests to forward to multiplexer M2, which additionally receives as an input a remote request received from local interconnect 514 via remote request path 526. Arbiter 505 schedules local and remote memory access requests for processing and, based upon the scheduling, generates a sequence of select signals 528. In response to select signals 528 generated by arbiter 505, multiplexer M2 selects either the local request received from multiplexer M1 or the remote request snooped from local interconnect 514 as the next memory access request to be processed.

A request selected for processing by arbiter 505 is placed by multiplexer M2 into dispatch pipeline 506. Dispatch pipeline 506 preferably is implemented as a fixed duration pipeline in which each of multiple possible overlapping requests A, B, C, etc. is processed for a predetermined number of clock cycles. For example, dispatch pipeline 506 may process each request for four cycles.

During a first cycle of processing within dispatch pipeline 506, a 1-cycle directory read is performed utilizing the request address to determine if the request address hits or misses in directory 508, and if the memory address hits, the coherency state of the memory block within directory 508. The directory information, which includes a hit/miss indication and the coherency state of the memory block, is returned by directory 508 to dispatch pipeline 506 in a subsequent cycle, such as the fourth cycle. As will be appreciated, no action is generally taken within an L2 cache slice 110a in response to miss on a remote memory access request; such remote memory requests are accordingly discarded from dispatch pipeline 506. However, in the event of a hit or miss on a local memory access request or a hit on a remote memory access request, L2 cache slice 110a will service the memory access request, which for requests that cannot be serviced entirely within processing unit 100, may entail communication on local interconnect 514 via fabric controller 516.

At a predetermined time during processing of the memory access request within dispatch pipeline 506, arbiter 505 transmits the request address to cache array 502 via address and control path 530 to initiate a cache read of the memory block specified by the request address. A cache read takes 2 cycles in the exemplary embodiment. The memory block read from cache array 502 is transmitted via data path 542 to error correcting code (ECC) logic 544, which checks the memory block for errors and, if possible, corrects any detected errors. For processor load requests, the memory block is also transmitted to load data multiplexer M3 via data path 540 for forwarding to the affiliated processor core 102.

At the last cycle of the processing of a memory access request within dispatch pipeline 506, dispatch pipeline 506 make a dispatch determination. For example, dispatch pipeline 506 may make the dispatch determination based upon a number of criteria, including (1) the presence of an address collision between the request address and a previous request address currently being processed by a castout machine 510, snoop machine 511 or RC machine 512, (2) the directory information, and (3) availability of an RC machine 512 or snoop machine 511 to process the memory access request. If dispatch pipeline 506 makes a dispatch determination that the memory access request is to be dispatched, the memory access request is dispatched from dispatch pipeline 506 to an RC machine 512 or a snoop machine 511. If the memory access request fails dispatch, the failure is signaled to the requestor (e.g., local or remote processor core 102) by a retry response. The requestor may subsequently retry the failed memory access request, if necessary.

While an RC machine 512 is processing a local memory access request, the RC machine 512 has a busy status and is not available to service another request. While an RC machine 512 has a busy status, the RC machine 512 may perform a directory write to update the relevant entry of directory 508, if necessary. In addition, the RC machine 512 may perform a cache write to update the relevant cache line of cache array 502. A directory write and a cache write may be scheduled by arbiter 505 during any interval in which dispatch pipeline 506 is not already processing other requests according to the fixed scheduling of directory reads and cache reads. When all operations for the given request have been completed, the RC machine 512 returns to an unbusy state.

It will be appreciated that the scheduling of non-fixed-schedule operations such as directory writes and cache writes can impact the scheduling of other operations, including those processed according to a fixed schedule.

Figure 6:
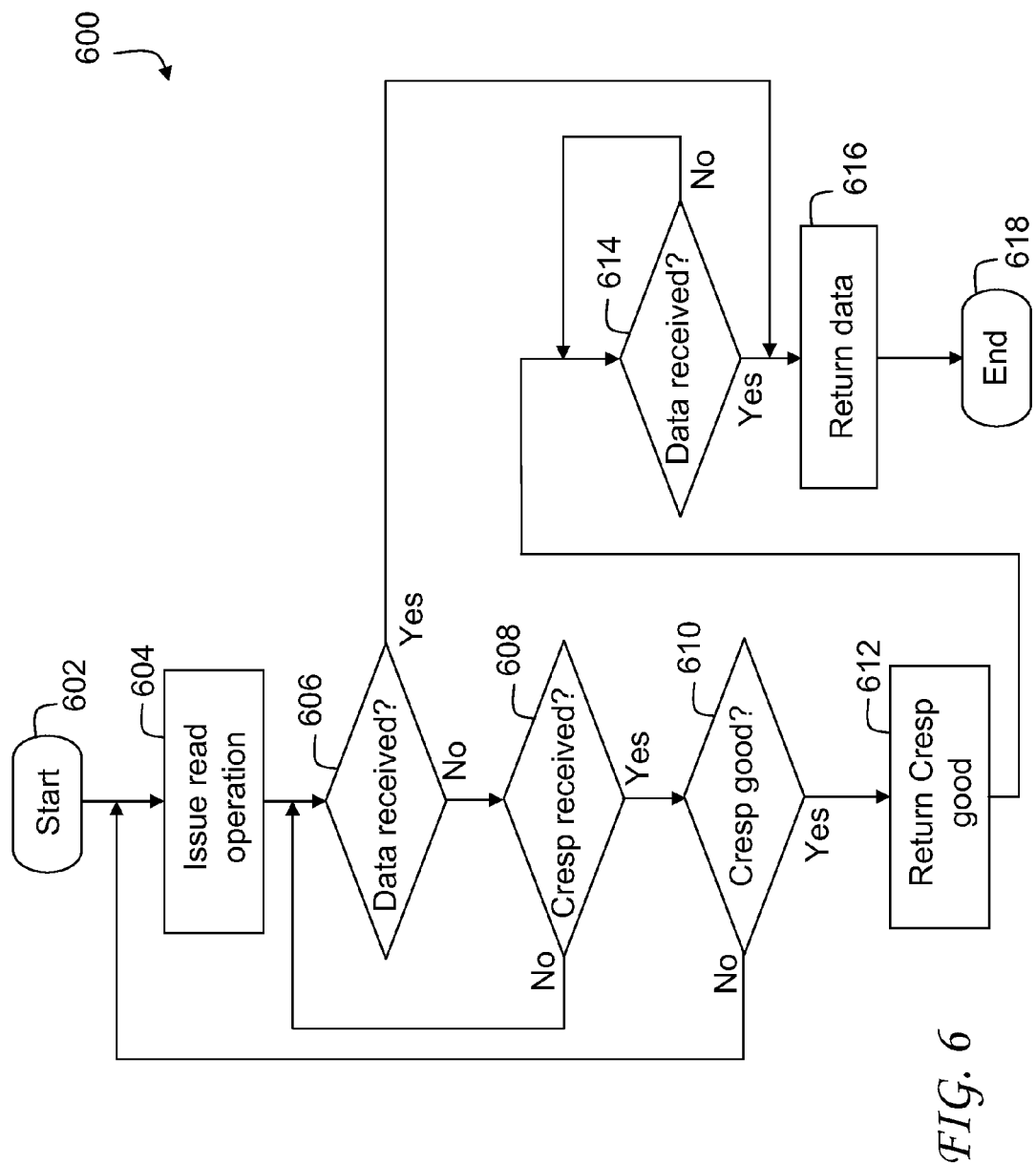
FIG. 6 is a flowchart of an exemplary process implemented by a read-claim (RC) machine of FIG. 5.

With reference to FIG. 6, a flowchart of an exemplary process 600, implemented by an RC machine 512 configured according to an embodiment of the present disclosure, is illustrated. In block 602 process 600 is initiated, at which point control transfers to block 604. In block 604 RC machine 512 issues on the interconnect fabric a read operation corresponding to a load instruction (that is included in an instruction sequence that includes a barrier instruction following the load instruction) in response to a cache miss for the target address of the load instruction in directory 508. Next, in decision block 606, RC machine 512 determines whether data for the read operation has been received, for example, from another L2 cache 110 or system memory 132. In response to RC machine 512 determining that data has been received for the read operation in block 606, control transfers from block 606 to block 616, where the data for the read operation is returned (via multiplexer M3) to an associated processor core 102. In response to data not being received for the read operation in block 606, control transfers from block 606 to decision block 608.

In block 608 RC machine 512 determines whether a Cresp has been received for the read operation. In response to a Cresp for the read operation not being received in block 608, control transfers from block 608 to block 606. In response to a Cresp for the read operation being received in block 608, control transfers from block 608 to decision block 610. In block 610, RC machine 512 determines whether the Cresp received for the read operation is "good," meaning that the data requested by the read operation will be supplied, for example, by another L2 cache 110 or system memory 132 in data processing system 200. In response to the Cresp not being good in block 610, control transfers from block 610 to block 604, where the read operation is re-issued. In response to the Cresp being good in block 610, control transfers from block 610 to block 612.

In block 612 RC machine 512 returns (via multiplexer M5) a good Cresp indication to processor core 102. Next, in decision block 614, RC machine 512 determines whether data has been received for the read operation. In response to data not being received for the read operation in block 614, control loops on block 614. In response to data being received for the read operation in block 614, control transfers from block 614 to block 616, where RC machine 512 returns the data requested by the read operation to processor core 102. Following block 616 control transfers to block 618 where process 600 terminates until RC machine 512 is assigned another memory access operation.

Figure 7:
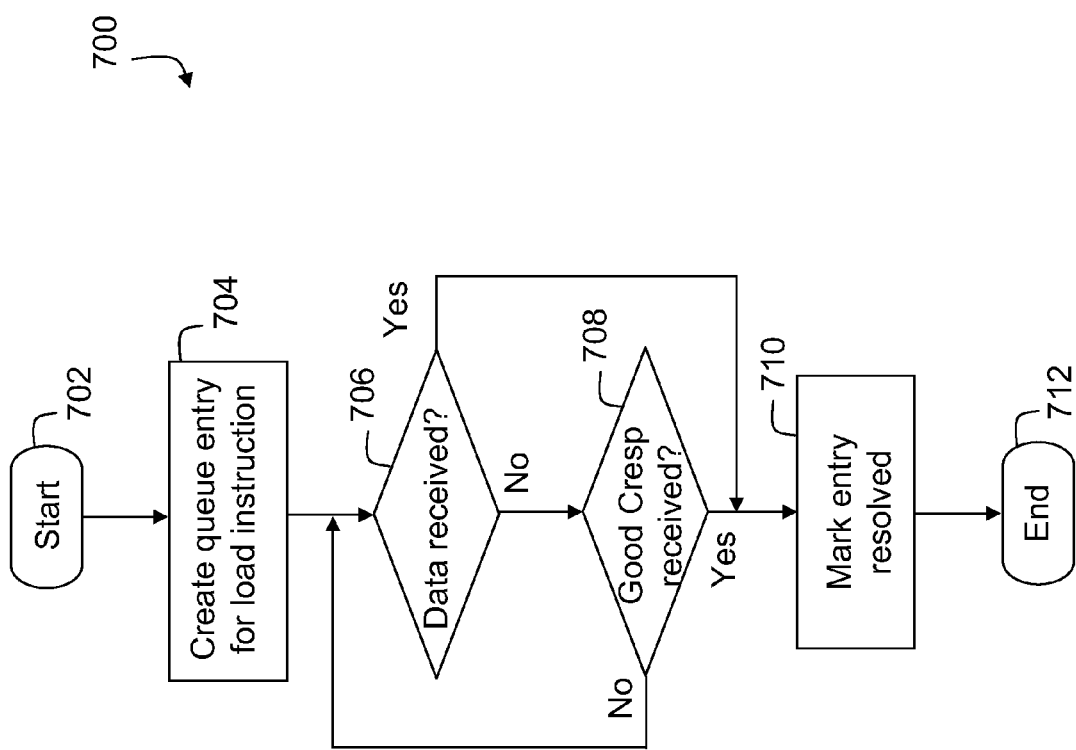
FIG. 7 is a flowchart of an exemplary process employed by a processor core load reorder queue resolving logic included in a load-store unit (LSU) of FIG. 5.
Figure 8:
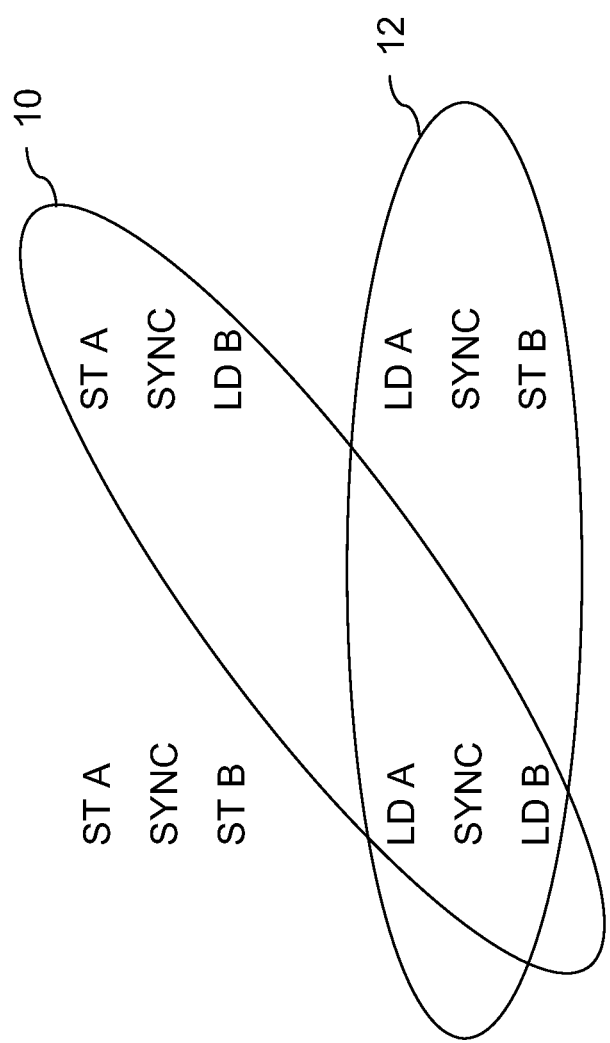
FIG. 8 is a diagram illustrating four cases that are possible with respect to employing a barrier instruction (SYNC) to order store (ST) and load (LD) instructions.

With reference to FIG. 7, a flowchart of an exemplary process 700, implemented by processor core load reorder queue resolving logic 555b of LSU 555 according to an embodiment of the present disclosure, is illustrated. In block 702 process 700 is initiated, at which point control transfers to decision block 704. In block 704, resolving logic 555b of LSU 555 creates a queue entry in a load reorder queue (LRQ) 555a of LSU 555 for a load instruction that precedes a barrier instruction in an instruction sequence. Next, in decision block 706, resolving logic 555b of LSU 555 determines whether the data requested by the load instruction has been received. In response to a determination at block 706 that the data requested by the load instruction has not yet been received, control transfers to decision block 708. If, however, a determination is made at block 706 that the data requested by the load instruction has been received, control transfers to block 710.

In block 708, resolving logic 555b of LSU 555 determines whether a good Cresp has been received for the load instruction. In response to a determination at block 708 that a good Cresp has not yet been received, control transfers to block 706. In response to a determination at block 708 that a good Cresp has been received, control transfers to block 710. In block 710 resolving logic 555b of LSU 555 marks the entry for the load instruction in LRQ of LSU 555 as resolved. Following block 710 control transfers to block 712 where process 700 ends.

Figure 9:
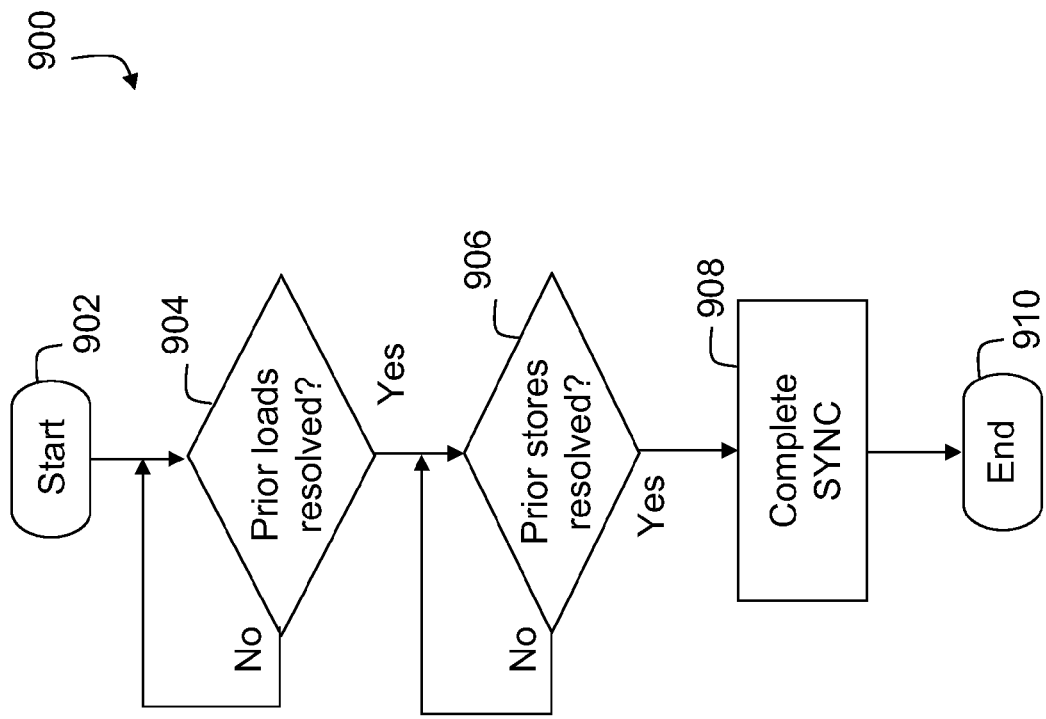
FIG. 9 is a flowchart of an exemplary barrier release process employed by the processor core load reorder queue resolving logic of the LSU of FIG. 5.

With reference to FIG. 9, a flowchart of an exemplary barrier release process 900 (e.g., implemented by LSU 555) is illustrated. Process 900 is implemented in response to execution of a barrier instruction. In block 902 process 900 is initiated, at which point control transfers to decision block 904. In block 904, resolving logic 555b of LSU 555 determines whether all load instructions prior to the barrier instruction have been resolved. In the event that all load instructions prior to the barrier instruction have not been resolved control loops on block 904. In response to all load instructions prior to the barrier instruction being resolved in block 904 control transfers to decision block 906. In decision block 906 resolving logic 555b of LSU 555 determines whether all store instructions prior to the barrier instruction have been resolved by determining if an ACK for the given barrier instruction has been received. In the event that all store instructions prior to the barrier instruction have not been resolved control loops on block 906. In response to all store instructions prior to the barrier instruction being resolved in block 906 control transfers to block 908. In block 908 resolving logic 555b of LSU 555 completes the SYNC operation for the barrier instruction, at which point execution of memory access instructions following the barrier instruction may proceed. Following block 908 process 900 terminates in block 910.

Accordingly, techniques have been disclosed herein that may advantageously improve processor performance when executing an instruction sequence that includes a barrier instruction. For example, when a good combined response for a load instruction is received at a processor core prior to data for the load instruction being received at the processor core the barrier instruction may be released in response to the good combined response improving processor performance by several hundred cycles in certain cases.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," (and similar terms, such as includes, including, has, having, etc.) are open-ended when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A data processing system configured to process an instruction sequence that includes a barrier instruction, a load instruction preceding the barrier instruction, and a subsequent memory access instruction following the barrier instruction, the data processing system comprising:
 a cache memory; and
 a processor core coupled to the cache memory, wherein the processor core is configured to:
  determine that the load instruction is resolved based upon receipt by the processor core of an earliest of a good combined response for a read operation corresponding to the load instruction and data for the load instruction;
  if execution of the subsequent memory access instruction is not initiated prior to completion of the barrier instruction, initiating by the processor core, in response to determining the barrier instruction completed, execution of the subsequent memory access instruction; and
  if execution of the subsequent memory access instruction is initiated prior to completion of the barrier instruction, discontinuing by the processor core, in response to determining the barrier instruction completed, tracking of the subsequent memory access instruction with respect to invalidation.

2. The data processing system of claim 1, wherein the processor core is further configured to:
 insert an entry for the load instruction into a load reorder queue; and mark the entry in the load reorder queue as resolved in response to determining that the load instruction is resolved.

3. The data processing system of claim 1, wherein the subsequent memory access instruction is a subsequent load instruction.

4. The data processing system of claim 1, wherein the subsequent memory access instruction is a subsequent store instruction.

5. The data processing system of claim 1, further comprising the processor core receiving the good combined response for the read operation corresponding to the load instruction prior to receiving the data for the load instruction.

6. The data processing system of claim 1, further comprising the processor core receiving the good combined response for the read operation corresponding to the load instruction subsequent to receiving the data for the load instruction.

7. The data processing system of claim 1, wherein the barrier instruction completes when all load and store instructions prior to the barrier instruction are resolved.

8. A data processing system configured to process an instruction sequence that includes a barrier instruction, a load instruction preceding the barrier instruction, and a subsequent memory access instruction following the barrier instruction, the data processing system comprising:
  a level two cache memory; and
  a processor core coupled to the cache memory, wherein the processor core is configured to:
    determine that the load instruction is resolved based upon receipt by the processor core of an earliest of a good combined response for a read operation corresponding to the load instruction and data for the load instruction;
    if execution of the subsequent memory access instruction is not initiated prior to completion of the barrier instruction, initiating by the processor core, in response to determining the barrier instruction completed, execution of the subsequent memory access instruction; and
    if execution of the subsequent memory access instruction is initiated prior to completion of the barrier instruction, discontinuing by the processor core, in response to determining the barrier instruction completed, tracking of the subsequent memory access instruction with respect to invalidation.

9. The data processing system of claim 8, wherein the processor core includes a load-store unit that includes a load reorder queue (LRQ) and LRQ resolving logic, and wherein the LRQ resolving logic is configured to:
  insert an entry for the load instruction into the LRQ; and
  mark the entry in the LRQ as resolved in response to determining that the load instruction is resolved.

10. The data processing system of claim 8, wherein the subsequent memory access instruction is a subsequent load instruction.

11. The data processing system of claim 8, wherein the subsequent memory access instruction is a subsequent store instruction.

12. The data processing system of claim 8, further comprising the processor core receiving the good combined response for the read operation corresponding to the load instruction prior to receiving the data for the load instruction.

13. The data processing system of claim 8, further comprising the processor core receiving the good combined response for the read operation corresponding to the load instruction subsequent to receiving the data for the load instruction.

* * * * *